United States Patent [19]

Gassman

[11] 3,915,068

[45] Oct. 28, 1975

[54] HYDROSTATIC TRANSMISSION
[75] Inventor: Max Paul Gassman, Waterloo, Iowa
[73] Assignee: Deere & Company, Moline, Ill.
[22] Filed: Aug. 30, 1974
[21] Appl. No.: 502,174

[52] U.S. Cl. ............... 91/420; 91/421; 60/460; 60/493; 180/66 R
[51] Int. Cl.$^2$ .................................. F15B 13/042
[58] Field of Search ........ 91/420, 421; 60/459, 460, 60/493; 180/66 R; 137/596.13, 596.14, 596.1

[56] References Cited
UNITED STATES PATENTS

| | | | |
|---|---|---|---|
| 2,328,979 | 9/1943 | Herman et al. | 91/420 |
| 2,328,980 | 9/1943 | Herman et al. | 91/420 |
| 2,431,032 | 11/1947 | Ernst | 91/420 |
| 3,523,490 | 4/1970 | Bianchetta | 91/420 |

*Primary Examiner*—Edgar W. Geoghegan

[57] ABSTRACT

A hydrostatic drive system for a land vehicle includes a fluid pump, a fluid reservoir, a pair of fluid motors connected to drive wheels of the vehicle, a supply line connected between the pump and motors, a return line connected between the reservoir and motors, and a retarder valve movable between open and closed positions and biased toward the closed position interposed in the return line. The retarder valve includes a servo chamber responsive to fluid pressure therein to move the retarder valve to its open position. First and second fluid passage means establish communication between the servo chamber and the supply and return lines, respectively. An additional valve movable between open and closed positions and biased toward the open position is interposed in the second fluid passage means and is responsive to a predetermined pressure in the supply line to move to its closed position. The retarder valve provides a braking effect if the motors are driven mechanically and begin to function as pumps, for example, when the vehicle is going down an incline at a speed greater than the capacity of the drive system, and the second fluid passage means and the valve therein prevents the retarder valve from completely closing and locking the wheels as long as the system is in operation.

6 Claims, 2 Drawing Figures

HYDROSTATIC TRANSMISSION

BACKGROUND OF THE INVENTION

The present invention relates generally to hydrostatic transmissions drive systems, and more specifically relates to such a transmission or drive system with an improved retarder system to limit overrunning of the transmission and provide a braking effect.

With a land vehicle having a mechanical transmission where there is a positive connection between the vehicle engine and drive wheels, the vehicle engine can be used to brake the vehicle to retard its movement. This is a desirable feature when it is desired to decelerate the vehicle or when it is desired to brake the vehicle while traveling down an incline, etc. When the engine is not running the mechanical connection also makes it possible to use the load of the engine to hold the vehicle in a stationary position. The braking or retarding feature is not available in a vehicle with a simple hydrostatic transmission since, if the vehicle wheels are driven mechanically, for example, when the vehicle rolls down an incline, the wheel motors simply function as pumps and their output is directed to a low pressure source.

Attempts have been made to provide hydrostatic transmissions with braking or retarder feature available with mechanical transmissions by utilizing retarding valves which create a resistance to fluid flow in the return lines so that when the motors are driven mechanically and function as pumps they have to overcome such resistance. However, all such retarding systems have had one or more of the following disadvantages: (1) the hydrostatic transmission would have to overcome the resistance to flow in the return line during normal operation; (2) the retarder valve could, under certain operating conditions, completely close and lock the drive motors; and (3) the retarder valve could not be completely closed to lock the drive motors and function as a parking brake.

SUMMARY OF THE INVENTION

The present invention has for its object to provide a retarder valve system for hydrostatic transmission which provides no resistance to return oil flow during normal operation and which, during periods when the drive motors function as pumps and the pressure in the supply line drops, resist fluid flow through the return line to provide a braking effect without locking the drive motors.

The above object is accomplished by providing a retarder valve in the return line which is normally held open by fluid pressure in the transmission supply line, which moves towards its closed position when the fluid pressure in the supply line drops below a predetermined value, and which, as it approaches its closed position is responsive to fluid pressure in the return line to maintain its partially closed position.

The above object and additional objects of the present invention will become apparent to those skilled in the art by a reading of the following description when taken in conjunction with the accompanying drawing.

DESCRIPTION OF THE PREFERRED EMBODIMENTS

Figure 1:
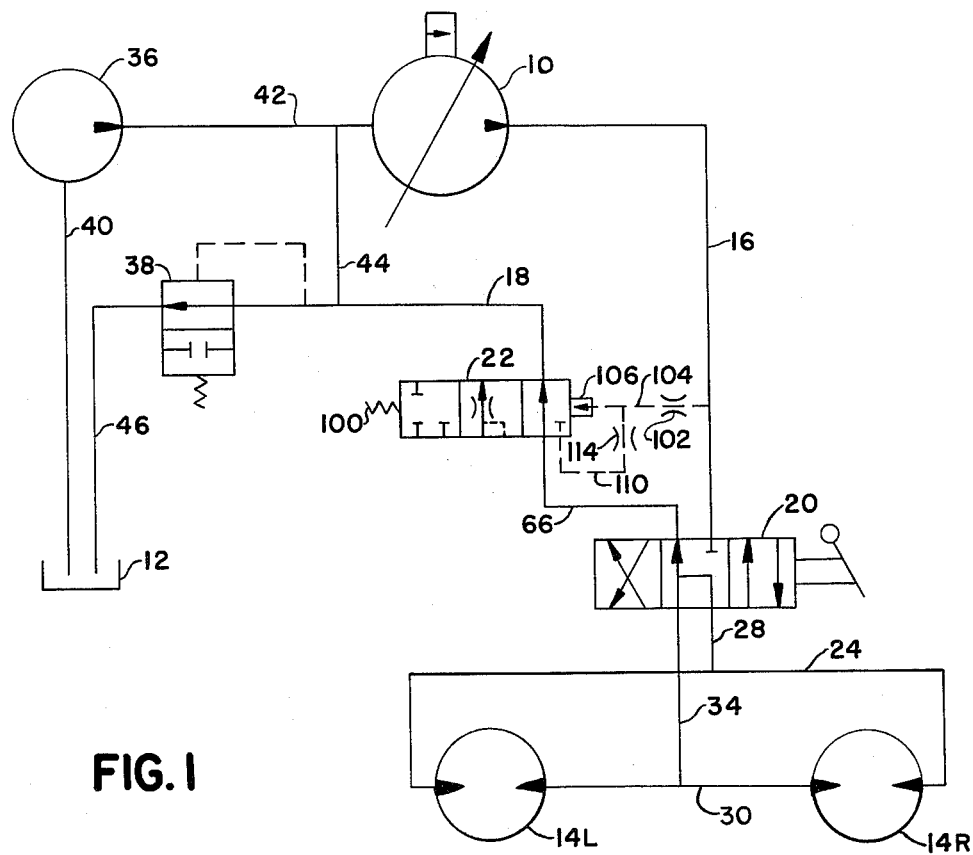
FIG. 1 is a schematic illustration of a hydrostatic transmission in which the retarder system according to the present invention has been incorporated.

Referring to FIG. 1, the basic components of the hydrostatic transmission include a substantially constant pressure variable volume pump 10, a fluid reservoir 12, a pair of hydraulic motors 14L and 14R which are drivingly connected to the drive wheels of a land vehicle, a fluid supply line 16, a fluid return line 18, a directional flow control valve 20 and a retarder valve 22. The normal inlet ports of the motors 14 are connected in parallel by fluid line 24 which in turn is connected to a port 26 in the directional flow control valve 20 by a fluid line 28. The normal outlet ports of the motors 14 are connected in parallel by a fluid line 30 which in turn is connected to a port 32 in the directional flow control valve 20 by a fluid line 34.

The hydrostatic transmission also includes a make-up pump 36 and a pressure relief valve 38. The make-up pump 36 draws hydraulic fluid from the reservoir 12 through a fluid line 40 and delivers the fluid to the pump 10 through a fluid line 42. The fluid line 42 is also connected to the return line 18 through a fluid line 44 so that oil returned through line 18 is also delivered to the pump 10. The pressure relief valve 38 drains fluid from the return line 18 to the reservoir 12 through a fluid line 46 so that excess pressure does not build up within the return line 18 and also assures that sufficient pressure is maintained in the line 42 to provide proper feeding of the pump 10.

Figure 2:
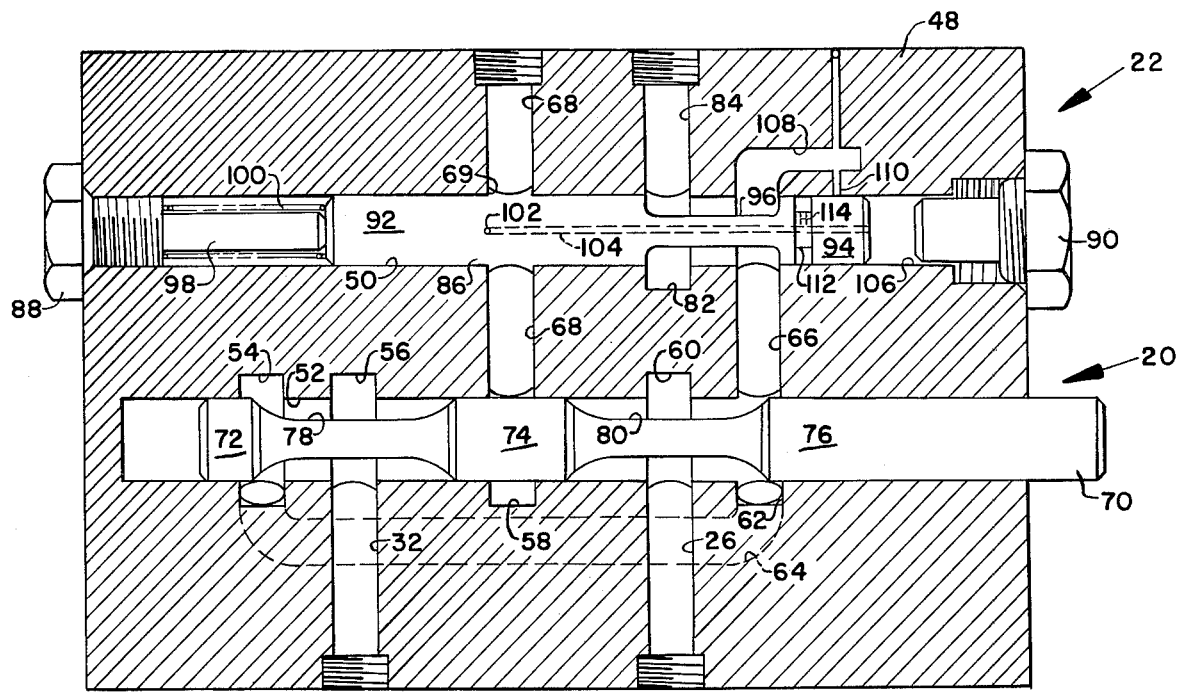
FIG. 2 is a sectional view through a directional flow control valve and retarder valve of the types schematically illustrated in FIG. 1.

The retarder valve 22 and directional flow control valve 20 are best illustrated in FIG. 2 and are shown as being formed with a common valve body 48 which has provided therein a retarder valve bore 50 and a directional flow control valve bore 52. The bore 52 is provided with five spaced annular grooves 54, 56, 58 60 and 62. A passage 64 establishes constant communication between the grooves 54 and 62 and a passage 66 extends from the groove 62 to the retarder valve bore 50. The grooves 56 and 60 are in communication with the ports 32 and 26, respectively, and the annular groove 58 is in communication with a supply passage 68 which intersects the bore 50 through an annular groove 69 and is connected to the supply line 16.

A control spool 70 is slidably mounted in the bore 52 and is provided with three spaced lands 72, 74 and 76 which define spooling grooves 78 and 80 therebetween. The lands 72 and 74 are spaced apart a distance such that when the spool 70 is in a neutral position with the land 74 blocking communication between the bore grooves 56 and 58 and the bore grooves 60 and 58, the spooling groove 78 provides communication between the bore grooves 54 and 56 and the spooling groove 80 provides communication between the bore grooves 60 and 62. When the spool 70 is shifted to the right the land 72 blocks communication between the bore grooves 54 and 56, the spooling groove 78 provides communication between the bore grooves 56 and 58, and the spooling groove 80 provides communication between the bore grooves 60 and 62. When the spool 70 is shifted to the left the land 76 blocks communication between the bore grooves 60 and 62, the spooling groove 80 provides communication between the bore grooves 58 and 60, and the spooling grooves 78 provides communication between the bore grooves 54 and 56.

In addition to the bore groove 69, the retarder valve bore 50 is also provided with an annular groove 82 which is located between the groove 69 and the intersection between the bore 50 and the passage 66. A passage 84 extends from the groove 82 to the exterior of the valve body 48 and is connected to the return line 18. A valve spool 86 is slidably mounted in the bore 50, and the left and right ends of the bore 50 are closed by plugs 88 and 90, respectively. The spool 86 is provided with lands 92 and 94 at its opposite ends which define a spooling groove 96 therebetween. Land 92, in all positions of the spool 86, blocks communication between the bore groove 69 and the bore 50, and the spooling groove 96 is of sufficient length to establish free communication between the bore groove 82 and the passage 66 when the spool 86 is moved to its limit to the left. The movement of the spool 86 to the left is limited by a projection 98 on the plug 88. A spring 100 encircles the projection 98 and acts against the plug 88 and the left end of the spool 86 to bias the spool 86 to the right, closed position in which the land 92 blocks communication between the bore groove 82 and the passage 66. Movement of the spool 86 to the right is limited by engagement between the right end of the spool 86 and the plug 90. As will be hereinafter more fully explained, the right end of the bore 50 and the land 94 on the spool 86 define a servo chamber 106 with the land 94 further defining means responsive to fluid pressure therein to move the valve 86 to the left against the bias of the spring 90.

The spool 86 is provided with a transverse bore 102 which is in constant communication with the bore groove 69 and an additional bore 104 which extends longitudinally through the spool 86 from the transverse bore 102 to the right end of the spool 86 where it communicates with the servo chamber 106. The bores 102 and 104 constitute a pilot passage establishing communication between the supply line 16 and the servo chamber 106.

An additional pilot line extends between the return line and the servo chamber and is formed by a passage 108 in communication with the passage 66, a passage 110 establishing communication between the passage 108 and the bore 50, an annular groove 112 provided in the land 94 of the spool 86, and a transverse bore 114 establishing communication between the annular groove 112 and the bore 104. Communication between the passage 110 and bore 50 is blocked by the land 94 when the spool 86 is shifted to the left, and as the spool 86 moves to the right the annular groove 112 establishes communication between the passage 110 and bore 114. When the spool 86 is moved to its limit to the right, the left end of the land 94 again blocks communication between the bore 50 and the passage 110.

For reason which will become apparent in the following description of operation the transverse bores 102 and 114 are of a size to constitute restrictions in the pilot passages.

During periods of normal operation, the substantially constant pressure, variable volume pump 10 supplies fluid pressure to the supply line 16. When the directional flow control valve 20 is in the neutral position illustrated in FIG. 1 there is no fluid supplied to the motors 14, but the fluid pressure in the supply line 16 is routed to the servo chamber 106 through the bores 102 and 104 to hold the spool 86 in its open position. By shifting the valve spool 70 to the left, fluid pressure from the supply line 16 is routed through bore groove 58, spooling groove 80, bore groove 60, port 26 and lines 28 and 24 to the inlet ports of the motors 14. Fluid from the outlet ports of the motors 14 is routed through the lines 30 and 34, the port 32, bore grooves 56 and 54, passage 64, bore groove 62, passage 66, spooling groove 96, bore groove 82 and passage 84 to the return line 18. The fluid pressure in the return line 18 is routed through the line 44 to the pump 10 and, if the fluid in the return line 18 plus the fluid supplied by the charge pump 36 is more than is required by the pump 10, the pressure in the return line 18 will build up and open the valve 39 to exhaust fluid through the line 46 to the reservoir 12.

If the motors 14 are driven mechanically as would occur if the vehicle rolls down an incline at a rate faster than it would normally be driven by the hydrostatic transmission, the pressure in the supply line 16 will decrease. After the pressure in the supply line has decreased a sufficient amount so that the pressure in the servo chamber 106 provides a force on the spool 86 which is less than the force provided by the spring 100, the spool 86 will shift to the right and throttle fluid flow from the passage 66 to the bore groove 82. This throttling will cause a pressure buildup in the return line between the motors and the retarder valve which serves as a load on the motors 14. The load on the motors 14 will function as a brake to retard movement of the vehicle. As the throttle spool 86 approaches its closed position, communication is established between the passage 110 and the annular groove 112 so that the pressure in the return line between the motors and the retarder valve is routed to the servo chamber 106, and since this pressure will be proportional to the amount of throttling it will hold the spool 86 away from its completely closed position. When the vehicle slows to its normal speed pressure in the supply line 16 will increase and again move the spool 86 to its fully open position.

The bore or orifice 114 restricts flow through the pilot passage between the return line and servo chamber to prevent over action of the spool 86. For example, pressure in the servo chamber 106 will move the valve spool 86 slow enough so that it will not overshoot a position in which it is balanced between the spring 100 and the pressure in the servo chamber 106. The bore or orifice 102 restricts flow from the servo chamber 106 a sufficient amount so that the flow of fluid through the pilot passage between the passage 66 and servo chamber 106 can build up pressure within the servo chamber 106.

If the spool 70 of the directional flow control valve 20 is shifted to the right from its neutral position the retarder valve operates in exactly the same manner and the only difference in the operation of the total system is that the motor inlets serve as the motor outlets and the motor outlets serve as the motor inlets.

If the vehicle engine is shut off so that the pump 10 no longer is in operation the transmission will lose all pressure so that the spool 86 of the retarder valve 22 will shift to its completely closed position. With the retarder valve spool 86 completely closed and the spool 70 of the directional flow control valve 20 in either its forward or reverse position, the motors 14 will be locked since the return passage is completely blocked. This will prevent any accidental movement of the tractor when it is parked. If the directional flow control valve 70 is left in its neutral position when the vehicle engine is shut off, communication is established between the motor inlets and outlets through the directional flow control valve so the vehicle can still be towed. When the spool 86 is in its completely closed position the left hand end of the land 94 blocks communication between the groove 112 and passage 110 so the spool 86 can not be moved to its open position until fluid pressure again builds up in the supply line 16.

From the foregoing it can be seen that the present invention provides a retarder system for a hydrostatic transmission which provides a braking effect on the vehicle when the vehicle attempts to move faster than it would normally be driven by the transmission, which prevents the motors of the transmission from locking during operation, and which will lock the motors when the transmission is not in operation.

Having thus described a single preferred embodiment of the invention, various modifications within the spirit and scope of the invention will become apparent to those skilled in the art and can be made without departing from the underlying principles of the invention. Therefore, the invention should not be limited to the specific illustration and description, but only by the following claims.

I claim:

1. A hydrostatic drive system for a vehicle comprising: a source of fluid pressure; a fluid reservoir; fluid motor means drivingly coupled to drive wheel means of the vehicle and having inlet and outlet ports; supply line means interconnecting the source and motor inlet port; return line means interconnecting the reservoir and motor outlet port; retarder valve means movable between open and closed positions and biased toward the closed position interposed in the return line means; pressure responsive means associated with the retarder valve means to move the same toward its open position in response to fluid pressure; first passage means establishing communication between the supply line means and pressure responsive means; second passage means establishing communication between the return line means and the pressure responsive means; and valve means movable between open and closed positions and biased toward the open position interposed in the second passage means; and means associated with the last mentioned valve means responsive to a predetermined pressure in the supply line means to hold the last mentioned valve means in its closed position.

2. A hydrostatic drive system for a vehicle comprising: a source of fluid pressure; a fluid reservoir; fluid motor means drivingly coupled to drive wheel means of the vehicle and having inlet and outlet ports; supply line means interconnecting the source and motor inlet port; return line means interconnecting the reservoir and motor outlet port; retarder valve means movable between open and closed positions interposed in the return line means; means biasing the retarder valve means toward the closed position; servo means associated with the retarder valve means responsive to fluid pressure to bias the retarder valve means toward its open position in opposition to the biasing means; first pilot passage means interconnecting the supply line means and the servo means; second pilot passage means interconnecting the return line means and the servo means; valve means movable between open and closed positions and biased toward its open position interposed in the second pilot passage means; and means responsive to fluid pressure in the servo means biasing the valve means in the second pilot passage means to the closed position.

3. A hydrostatic drive system as set forth in claim 2 wherein the retarder valve and the valve means interposed in the second pilot passage means are interconnected for simultaneous movement.

4. A hydrostatic drive system for a vehicle comprising: a source of fluid pressure; a fluid reservoir; fluid motor means drivingly coupled to drive wheel means of the vehicle and having inlet and outlet ports; supply line means interconnecting the source and motor inlet port; return line means interconnecting the reservoir and motor outlet port; retarder valve means interposed in the return line means including a valve body having a bore therein closed at both ends, a pair of ports connected to the return line and intersecting the bore at spaced locations; a spool slidably mounted in the bore and having lands at its opposide ends defining therebetween an annular grooved area of sufficient length to span the pair of ports and provide free communication therebetween; spring means acting between one closed end of the bore and one end of the spool biasing the spool toward a fluid blocking position in which the land on the one end of the spool blocks one of the pair of ports; the second closed end of the bore and the second end of the spool forming a servo chamber having a movable member therein responsive to fluid pressure therein to move the spool against the bias of the spring toward a fluid passing position in which the grooved area spans the pair of ports; first pilot passage means interconnecting the supply line means and the servo chamber; second pilot passage means interconnecting the servo chamber and return line means between the retarder valve means and motor means; and valve means interposed in the second pilot passage means; the last mentioned valve means being interconnected with the retarder valve means for movement therewith between a closed position when the retarder valve means is in its fluid passing position and an open position when the retarder valve means approaches its fluid blocking position.

5. A hydrostatic drive system as set forth in claim 4 wherein the supply line means includes a pair of aligned ports in the valve body intersecting the bore in the area of the land on the one end of the spool, the spool is provided with a transverse bore in the land on the one end thereof in an area to be in communication with said pair of aligned ports throughout the range of movement of the spool, and the spool is provided with an additional bore extending between and establishing communication between the transverse bore and the servo chamber.

6. A hydrostatic drive system as set forth in claim 5 wherein the land on the second end of the spool is provided with an annular groove, and the second pilot passage means includes a second transverse bore extending from the annular groove to the additional bore and passage means establishing communication between the upstream one of the pair of ports connected to the return line means and the bore in the valve body in the area of the land on the second end of the spool to communicate with the annular groove as the spool approaches its fluid blocking position and to be blocked by the land on the second end of the spool when the spool is in its fluid passing position.

* * * * *